United States Patent
Paulus et al.

(10) Patent No.: US 11,257,629 B2
(45) Date of Patent: Feb. 22, 2022

(54) SOLID ELECTROLYTIC CAPACITOR FOR A TANTALUM EMBEDDED MICROCHIP

(71) Applicant: AVX Corporation, Fountain Inn, SC (US)

(72) Inventors: Joseph W. Paulus, Portland, ME (US); John Sturmer, Wells, ME (US); Jason Laforge, Naples, ME (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 16/268,610

(22) Filed: Feb. 6, 2019

(65) Prior Publication Data

US 2019/0252127 A1    Aug. 15, 2019

Related U.S. Application Data

(60) Provisional application No. 62/629,157, filed on Feb. 12, 2018.

(51) Int. Cl.
*H01G 9/15* (2006.01)
*H01G 9/052* (2006.01)
(Continued)

(52) U.S. Cl.
CPC ............. *H01G 9/15* (2013.01); *H01G 9/0036* (2013.01); *H01G 9/028* (2013.01); *H01G 9/032* (2013.01);
(Continued)

(58) Field of Classification Search
CPC ...................................................... H01G 9/012
See application file for complete search history.

(56) References Cited

U.S. PATENT DOCUMENTS

| 3,345,545 | A | 10/1967 | Bourgault et al. |
| 4,761,714 | A | 8/1988 | Levasseur et al. |

(Continued)

FOREIGN PATENT DOCUMENTS

| JP | 04164308 A | * | 6/1992 |
| JP | 2000150305 A | | 5/2000 |

(Continued)

OTHER PUBLICATIONS

International Search Report and Written Opinion for PCT/US2019/016743, dated May 24, 2019, 13 pages.

*Primary Examiner* — Eric W Thomas
(74) *Attorney, Agent, or Firm* — Dority & Manning, P.A.

(57) ABSTRACT

A solid electrolytic capacitor and method for making the capacitor are provided. The capacitor includes a porous anode body, an anode foil, a dielectric, a cathode, and anode and cathode terminations. The foil is disposed on a planar surface of the anode body, and both comprise a valve metal. Further, the dielectric overlies at least a portion of the anode body, and the dielectric is also formed within the anode body. The cathode overlies at least a portion of the dielectric that overlies the anode body and includes a solid electrolyte, where at least a portion of a lower surface of the foil is free of both the dielectric and the solid electrolyte. In addition, the anode termination is electrically connected to the portion of the lower surface of the foil that is free of both the dielectric and the solid electrolyte, and the cathode termination is electrically connected to the solid electrolyte.

18 Claims, 9 Drawing Sheets

(51) Int. Cl.
  *H01G 9/07* (2006.01)
  *H01G 9/00* (2006.01)
  *H01G 9/028* (2006.01)
  *H01G 9/042* (2006.01)
  *H01G 9/26* (2006.01)
  *H01G 9/032* (2006.01)

(52) U.S. Cl.
  CPC ........... *H01G 9/0425* (2013.01); *H01G 9/052* (2013.01); *H01G 9/07* (2013.01); *H01G 9/26* (2013.01)

(56) References Cited

U.S. PATENT DOCUMENTS

| | | | |
|---|---|---|---|
| 4,945,452 A | 7/1990 | Stunner et al. | |
| 5,357,399 A | 10/1994 | Salisbury | |
| 5,949,639 A | 9/1999 | Maeda et al. | |
| 6,191,936 B1 | 2/2001 | Webber et al. | |
| 6,197,252 B1 | 3/2001 | Bishop et al. | |
| 6,351,371 B1 | 2/2002 | Yoshida et al. | |
| 6,643,121 B1 | 11/2003 | Huntington | |
| 6,673,389 B1 | 1/2004 | Huntington | |
| 6,699,767 B1 | 3/2004 | Huntington | |
| 6,751,085 B1 | 6/2004 | Huntington | |
| 6,813,140 B1 | 11/2004 | Huntington | |
| 6,849,292 B1 | 2/2005 | Huntington | |
| 7,116,548 B2 | 10/2006 | Satterfield, Jr. et al. | |
| 7,262,511 B2 | 8/2007 | Osako et al. | |
| 7,323,395 B2 | 1/2008 | Huntington | |
| 7,515,396 B2 | 4/2009 | Biler | |
| 7,687,884 B2 | 3/2010 | Huntington | |
| 7,745,281 B2 | 6/2010 | Prymak et al. | |
| 8,218,292 B2 | 7/2012 | Rezai-Kalantary | |
| 9,966,196 B2 | 5/2018 | Paulus et al. | |
| 2004/0066608 A1* | 4/2004 | Takagi | H01G 9/012 361/530 |
| 2005/0111164 A1 | 5/2005 | Huntington | |
| 2005/0270725 A1 | 12/2005 | Hahn et al. | |
| 2006/0038304 A1 | 2/2006 | Osako et al. | |
| 2007/0253147 A1 | 11/2007 | Marek et al. | |
| 2008/0030922 A1 | 2/2008 | Hidaka et al. | |
| 2008/0106852 A1* | 5/2008 | Amita | H01G 9/042 361/528 |
| 2008/0198535 A1 | 8/2008 | Kuriyama | |
| 2008/0232037 A1 | 9/2008 | Biler | |
| 2010/0110615 A1* | 5/2010 | Nishimura | H01G 9/012 361/528 |
| 2011/0026192 A1* | 2/2011 | Rezai-Kalantary | H01G 13/00 361/529 |
| 2012/0147526 A1* | 6/2012 | Murata | H01G 9/04 361/523 |
| 2017/0287647 A1 | 10/2017 | Nobuta et al. | |

FOREIGN PATENT DOCUMENTS

| | | | |
|---|---|---|---|
| JP | 2004015071 A | * | 1/2004 |
| JP | 2011159659 A | * | 8/2011 |
| KR | 20080108662 A | | 12/2008 |
| KR | 20120051170 A | | 5/2012 |

* cited by examiner

SOLID ELECTROLYTIC CAPACITOR FOR A TANTALUM EMBEDDED MICROCHIP

CROSS REFERENCE TO RELATED APPLICATIONS

The present application claims the benefit of U.S. Provisional Application Ser. No. 62/629,157 having a filing date of Feb. 12, 2018, which is incorporated herein by reference for all purposes

BACKGROUND OF THE INVENTION

Solid electrolytic capacitors (e.g., tantalum capacitors) have been a major contributor to the miniaturization of electronic circuits and have made possible the application of such circuits in extreme environments. An example of a solid state capacitor and related mass production method for manufacturing surface mountable solid state capacitors is disclosed in U.S. Pat. No. 5,357,399 to Salisbury.

Some solid electrolytic capacitors have an anode lead formed of a substantially planar surface that is bonded to an anode body with a seed/seeding layer. Seed layers, and sometimes the anode bodies as well, have been formed as respective continuous planes of material that are cut in multiple dimensions to provide discrete capacitor elements. For example, U.S. Pat. No. 6,699,767 to Huntington discloses a method for manufacturing multiple solid state capacitors that includes steps for forming such seed and anode components. An entire upper surface of a wafer has sintered thereon a seed layer, for example a dispersion of tantalum powder. A green (i.e. un-sintered) mixture of fine-grained capacitor grade tantalum powder is then pressed onto the upper surface of the substrate to form a green layer. The green layer is sintered to fuse the fine grained powder into an integral porous network. The sintering process also fuses the porous layer to the coarse seeding layer. The substrate assembly is then machined to produce an orthogonal grid of transverse channels and longitudinal channels, which are cut to a depth just beyond the level of the porous tantalum layer so that the cuts impinge on the substrate. The machining process produces an array of orthogonal section bodies, on the substrate, which are ultimately processed to form the anode portions of the capacitors.

In a related variation to the above manufacturing process, a continuous plane of material forming a seed layer is formed over the substrate and sintered. Subsequently, anodes of the same or varying heights are matrix pressed onto the seeded wafer. After pressing, the anodes are sintered. A series of orthogonal cuts must still be performed through the seed layer slightly into the wafer to remove the seed from between respective anode layer bodies and form discrete capacitor elements.

The multiple steps for forming discrete capacitor elements, especially the cutting steps in U.S. Pat. No. 6,669,767 to Huntington to produce the transverse and longitudinal channels, can be a time-consuming and expensive part of the manufacturing process. In addition, generally thicker substrates are required so that the channels can be cut into the substrate beyond the level of the porous tantalum layer thereon, thus limiting potential volumetric efficiency of the capacitor elements.

Meanwhile, other capacitor elements require the use of an embedded anode lead wire that extends from a surface of the anode body or an anode lead wire that is welded to a surface of the anode body, where both types of capacitor elements have their own disadvantages. In particular, the anode lead wire reduces the volumetric efficiency of the resulting capacitor. Further, with an embedded anode lead wire, a higher sintering temperature is required to ensure that the anode lead wire is adequately bonded to the anode body. In addition, with a welded anode lead wire, the area of weld contact can be relatively small, so all of the weld energy is expended in a small area which results in deep penetration of the anode lead wire and weld zone into the anode body in order to achieve sufficient weld strength, and significant damage can occur in the weld area when high specific charge particles are utilized to form a thin porous anode body.

As such, a need currently exists for an improved capacitor element having a decreased height profile and increased volumetric efficiency that can be produced in a simplified, more cost-efficient process.

SUMMARY OF THE INVENTION

In accordance with one exemplary embodiment of the present invention, a solid electrolytic capacitor includes a porous anode body, an anode foil, a dielectric, a cathode, and anode and cathode terminations. The anode foil is disposed on a planar surface of the porous anode body, and both the porous anode body and the anode foil comprise a valve metal. Further, the dielectric overlies at least a portion of the porous anode body, and the dielectric is also formed within the porous anode body. In addition, the cathode overlies at least a portion of the dielectric that overlies the porous anode body and includes a solid electrolyte, where at least a portion of a lower surface of the anode foil is free of the dielectric and the solid electrolyte. Additionally, the anode termination is electrically connected to the portion of the lower surface of the anode foil that is free of the dielectric and the solid electrolyte, and the cathode termination is electrically connected to the solid electrolyte. Further, the anode foil can be impermeable to liquids.

In accordance with one exemplary embodiment of the present invention, a method of forming a solid electrolytic capacitor includes forming a porous anode body from a powder, sintering the porous anode body, welding an anode foil to a planar surface of the sintered porous anode body, anodically oxidizing at least a portion of the sintered porous anode body to form a dielectric that overlies at least a portion of the sintered porous anode body, where the dielectric is also formed within the sintered porous anode body, applying a solid electrolyte to at least a portion of the anodically oxidized sintered porous anode body, where at least a portion of a lower surface of the anode foil is free of both the dielectric and the solid electrolyte, electrically connecting the lower surface of the anode foil to an anode termination, and electrically connecting the solid electrolyte to a cathode termination. Further, the powder and the anode foil are formed from a valve metal.

Other features and aspects of the present invention are set forth in greater detail below.

BRIEF DESCRIPTION OF THE DRAWINGS

A full and enabling disclosure of the present invention to one skilled in the art, including the best mode thereof, is set forth more particularly in the remainder of the specification, including reference to the accompanying figures, in which.

Figure 1:
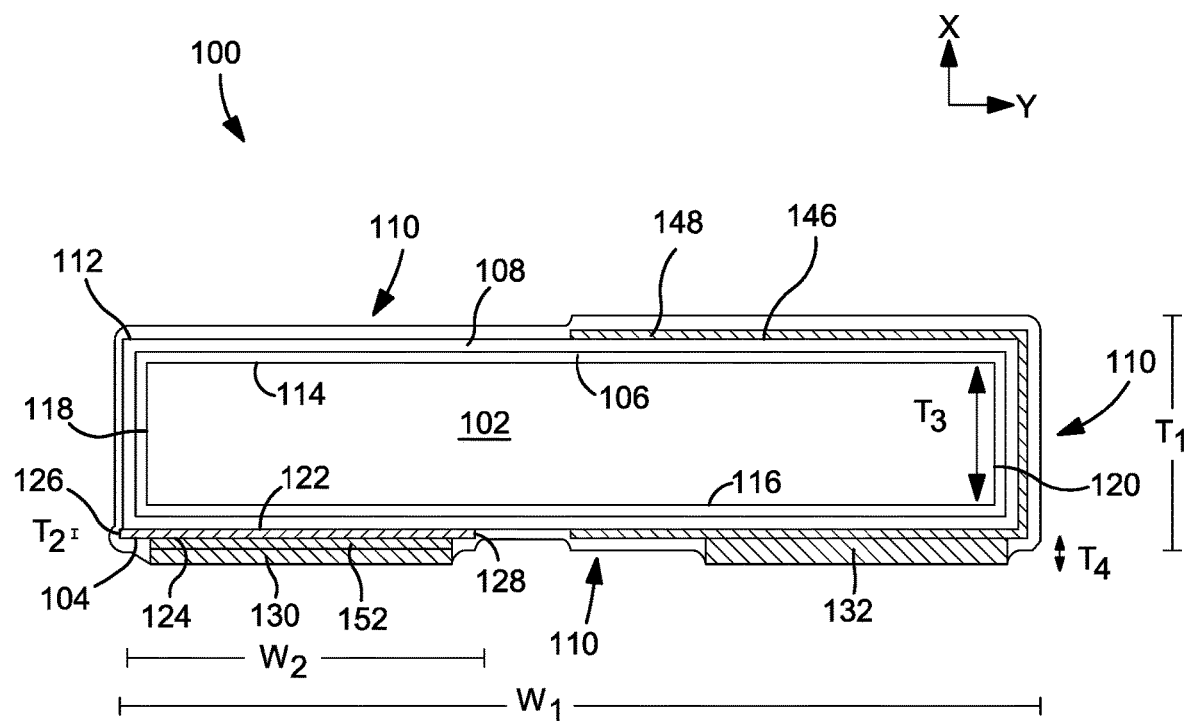
FIG. 1 is a cross-sectional view of a solid electrolytic capacitor in accordance with one embodiment of the present invention, where the solid electrolytic capacitor includes a two electrode configuration where one anode termination and one cathode termination are positioned on the same side of the solid electrolytic capacitor.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor and a method for making such a capacitor. The capacitor includes a porous anode body, an anode foil, a dielectric, a cathode, and anode and cathode terminations. The anode foil is disposed on a planar surface of the porous anode body, and both the porous anode body and the anode foil comprise a valve metal. For instance, an upper surface of the anode foil can be welded to a lower surface of the porous anode body so that the upper surface of the anode foil is in direct contact with a lower surface of the porous anode body (i.e., no seed layer is disposed between the porous anode body and the anode foil). Further, the dielectric overlies at least a portion of the porous anode body, and the dielectric is also formed within at least a portion of the porous anode body. The cathode overlies at least a portion of the dielectric that overlies the porous anode body and includes a solid electrolyte. Further, at least a portion of the lower surface of the anode foil is free of both the dielectric and the solid electrolyte. In addition, the anode termination is electrically connected to the portion of the lower surface of the anode foil that is free of both the dielectric and the solid electrolyte, and the cathode termination is electrically connected to the solid electrolyte. Further, the anode foil can be impermeable to liquids so that its lower surface is free of the dielectric and the solid electrolyte, thus enabling connection to an anode termination without requiring an anode lead wire, which allows for increased volumetric efficiency and permits anode-cathode isolation without the need for cumbersome mechanical processing.

Specifically, the present inventors have found that by welding an anode foil to a planar surface of a sintered anode body, where the anode foil is impermeable to liquids, the cathode layer cannot penetrate from the upper surface of the anode foil to the lower surface of the anode foil to contact the anode termination, where such contact could result in a short circuit during use of the resulting capacitor. In addition, the anode foil simplifies the production process and enables the formation of a volumetrically efficient capacitor having a lower height profile or thickness than capacitors that utilize an anode lead wire.

Various embodiments of the present invention will now be described in more detail.

I. Anode Component

The anode component, including the porous anode body and the anode foil, can both typically be formed from a valve metal composition containing a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In one particularly suitable embodiment, the valve metal composition contains tantalum.

Turning now to the porous anode body, it is to be understood that the porous anode body can be formed from a valve metal composition having a specific charge ranging from about 10,000 μF*V/g to about 500,000 μF*V/g, in some embodiments about 15,000 μF*V/g to about 400,000 μF*V/g, in some embodiments from about 20,000 μF*V/g to about 250,000 μF*V/g, in some embodiments from about 25,000 μF*V/g to about 125,000 μF*V/g. As is known in the art, the specific charge may be determined by multiplying capacitance by the anodizing voltage employed, and then dividing this product by the weight of the anodized electrode body.

In one particular embodiment, the porous anode body can be formed from a powder having a specific charge ranging from about 10,000 μF*V/g to about 70,000 μF*V/g, in some embodiments from about 15,000 μF*V/g to about 65,000 μF*V/g, and in some embodiments from about 20,000 μF*V/g to about 60,000 μF*V/g. It is also to be understood that in some embodiments, both the porous anode body can be formed from a powder having a higher specific charge ranging from about 60,000 μF*V/g to about 500,000 μF*V/g, in some embodiments from about 70,000 μF*V/g to about 400,000 μF*V/g, and in some embodiments from about 80,000 μF*V/g to about 300,000 μF*V/g.

To form the porous anode body from the valve metal composition, the powder of the valve metal composition may contain particles any of a variety of shapes, such as nodular, angular, flake, etc., as well as mixtures thereof. Particularly suitable powders are tantalum powders available from Showa (e.g., S506 powder, S708 powder, S15HB powder, etc.), Cabot Corp. (e.g., C255 flake powder, TU4D flake/nodular powder, etc.), and H.C. Starck (e.g., NH175 nodular powder). Although not required, the powder may be agglomerated using any technique known in the art, such as through heat treatment. Prior to forming the powder into the shape of an anode body, it may also be optionally mixed with a binder and/or lubricant to ensure that the particles adequately adhere to each other when sintered to form the anode body. It should be understood, however, that binders and/or lubricants are not necessarily required in the present invention, as the reduced thickness of the porous anode body may eliminate the need for a binder or lubricant to ensure adequate adherence of the particles to each other. The resulting powder may then be compacted to form a pellet (e.g., an anode body pellet) using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

In one particular embodiment, a press mold may be employed that includes a die having two or more portions (e.g., upper and lower portions) configured to form the anode body. During use, the portions of the die may be placed adjacent to each other so that their walls are substantially aligned to form a die cavity having the desired shape of the anode body. After filling the die with powder, the die cavity may then be closed and subjected to compressive forces by a punch.

Regardless of the specific press mold from which the anode pellet is formed, the resulting porous anode body can be pressed to a press density ranging from about 3.5 grams per cubic centimeter to about 10 grams per cubic centimeter, in some embodiments from about 3.75 grams per cubic centimeter to about 9 grams per cubic centimeter, and in some embodiments, from about 4 grams per cubic centimeter to about 8 grams per cubic centimeter, where the press density is determined by dividing the weight of the pressed porous anode body by the volume of the pressed porous anode body.

After pressing, any binder/lubricant that was optionally used may be removed by heating the porous anode body under vacuum at a certain temperature (e.g., from about 150° C. to about 500° C.) for several minutes. Alternatively, the binder/lubricant may also be removed by contacting the porous anode body with an aqueous solution, such as described in U.S. Pat. No. 6,197,252 to Bishop, et al., which is incorporated herein in its entirety by reference thereto for all purposes. Thereafter, the porous anode body can be sintered to form a porous anode body.

The porous anode body can typically be sintered at a temperature of from about 1200° C. to about 2000° C., in some embodiments from about 1300° C. to about 1900° C., and in some embodiments, from about 1500° C. to about 1800° C., for a time of from about 1 minute to about 100 minutes, and in some embodiments, from about 30 minutes to about 60 minutes. If desired and although not required, sintering may occur in an atmosphere that limits the transfer of oxygen atoms to the porous anode body. For example, sintering may occur in an inert, vacuum, or reducing atmosphere. In one particular embodiment, vacuum sintering may occur at a pressure of from about $1 \times 10^{-9}$ Torr to about 100 Torr, in some embodiments from about $1 \times 10^{-8}$ Torr to about 75 Torr, and in some embodiments from about $1 \times 10^{-7}$ Torr to about 50 Torr. In another embodiment, sintering may occur in a reducing atmosphere of, for instance, hydrogen, where the atmosphere can have a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may be employed in such a reducing atmosphere.

After sintering, the porous anode body can be welded to a planar surface of the anode foil. Although any suitable welding method may be utilized, in one particular embodiment, the porous anode body can be welded to the anode foil by resistance welding. As mentioned above, the anode foil can be formed from a valve metal and can be tantalum in one particular embodiment. Further, the anode foil can exist in a single plane such that a planar surface of the anode foil (e.g., its upper surface) can be welded to a planar surface of the sintered, porous anode body (e.g., its lower surface) in a precise manner. As mentioned above, the anode foil, which exists in a single plane, is impermeable to liquids, which helps to prevent the application of the dielectric layer or the cathode layer, such as a conductive polymer or $MnO_2$, on or near the anode termination, where it is to be understood that suitable mechanical or chemical means can also be utilized to prevent the dielectric layer or the cathode layer from coming into electrical contact with the anode termination. In addition, the volumetric efficiency of the resulting capacitor can be enhanced via use of the anode foil and anode body configuration of the present invention.

Meanwhile, an anode body (e.g., a tantalum pellet) with an embedded anode lead wire suffers from a weak sinter connection between the tantalum pellet and the very low surface area (low surface energy) anode lead wire, and this problem is exacerbated by the low pressed densities and sinter temperatures required to achieve good volumetric efficiencies using high specific charge tantalum powders. Further, while welding the anode lead wire results in a better bond than the sintering of an embedded wire, welding damages a proportionately large volume of the tantalum pellet to achieve this stronger connection, as a significant number of tantalum particles from the compact must be melted to create a weld nugget of sufficient size to realize the desired connection strength. Also, as these tantalum particles are consumed to create the weld nugget, a very large layer of tantalum oxide is created around the weld zone, which must be diffused during sintering or the anodes electrical properties will be degraded.

Alternatively, attaching a tantalum pellet to a seeded tantalum substrate is efficient for obtaining a very strong bond as the surface energy of the two surfaces being bonded (e.g., the seed layer and the tantalum pellet), are sufficiently high so that a strong bond can be achieved at sinter temperatures that maximize the efficiency of the high specific charge powders. Also, the bond between the layers is over a large contact area ensuring the high overall strength of the bond. However, this method consumes significant volume on the finished anode resulting in overall loss of volumetric efficiency.

By welding an anode foil directly to the porous anode body as described in the present invention, the aforementioned problems with anode lead wires and seeded substrates are overcome. First, in contrast to the embedded wire process, the bond strength is not determined by sintering or the surface energy of the materials being bonded. Secondly, the weld connection is spread over a very broad area, and significantly less weld energy per unit area is required to achieve a high strength connection because the connection is spread over such a large area. Because the weld damaged area is very shallow, less of the anode body is consumed to create a connection of reasonable strength, which, in turn, allows for the use of such an anode foil welding process on very small or very thin tantalum anode bodies. Further, due to the minimal amount of tantalum particles consumed to produce the weld connection, there is a significantly smaller tantalum oxide layer and therefore less oxygen to diffuse during the subsequent re-sinter in order to obtain an anode of high quality. Finally, the anode foil can have a thickness ranging from about 10 micrometers to about 300 micrometers, such as from about 15 micrometers to about 200 micrometers, such as from about 20 micrometers to about 150 micrometers, such as from about 25 micrometers to about 75 micrometers. Thus, the anode foil consumes less of the available volume of the anode resulting in higher volumetric efficiency of the anode body.

After the anode foil has been welded to the sintered porous anode body, the resulting anode component can be sintered in a reducing environment to eliminate any microstructural damage that may have occurred during welding. For example, the sintered porous anode body and the anode foil welded thereto can typically be sintered in a reducing environment at a temperature of from about 1200° C. to about 2000° C., in some embodiments from about 1300° C. to about 1900° C., and in some embodiments, from about 1500° C. to about 1800° C., for a time of from about 1 minute to about 100 minutes, and in some embodiments, from about 30 minutes to about 60 minutes, where the reducing environment limits the transfer of oxygen atoms to the porous anode body and the anode foil. For example, in one embodiment, sintering of the sintered porous anode body and the anode foil welded thereto may occur in a reducing atmosphere of, for instance, hydrogen, where the atmosphere can have a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may be employed in such a reducing atmosphere.

Figure 4:
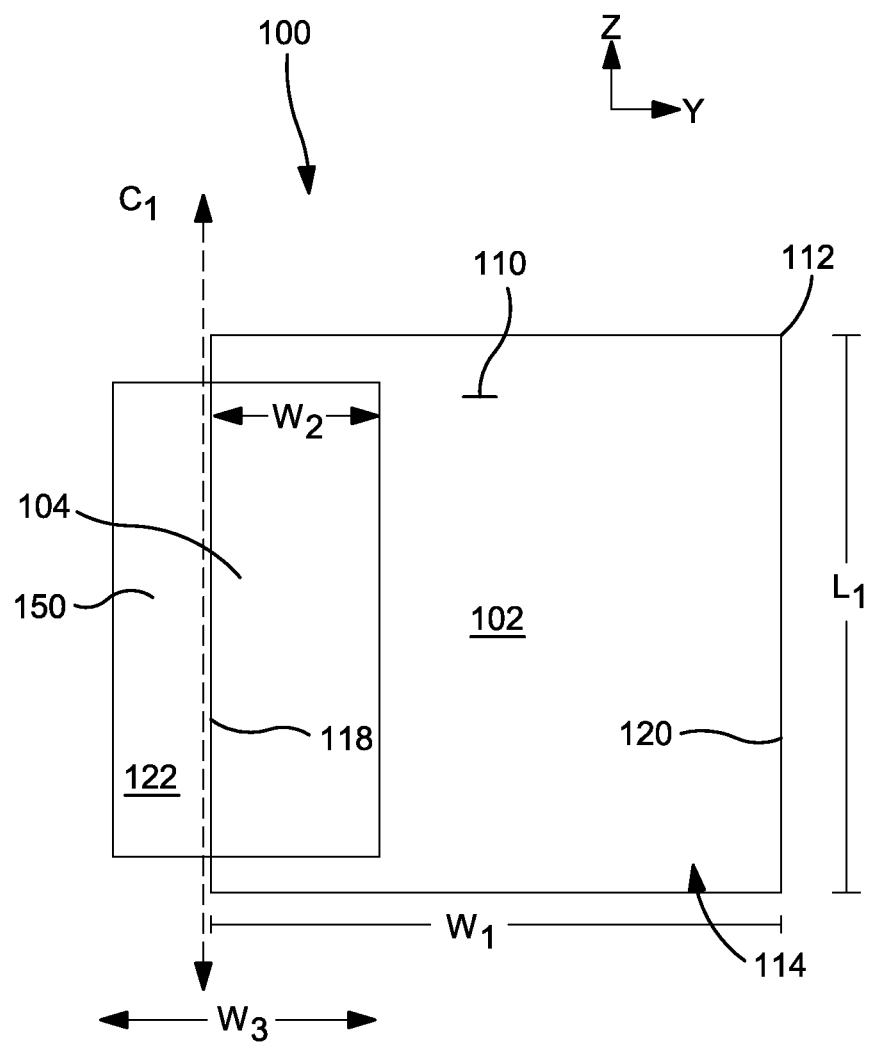
FIG. 4 is a top surface view of the solid electrolytic capacitor of FIG. 1 and illustrates an embodiment where the anode foil can extend beyond a surface of the anode body, where the anode foil includes a tab that extends beyond the anode body, thus providing a fixturing contact to the capacitor element during processing, where the tab can be removed via shearing, laser cutting, etc.

As shown in FIGS. 1 and 4, both the sintered porous anode body 102 and the anode foil 104 of the anode component of the solid electrolytic capacitor of the present invention can be in the shape of a rectangular pellet. In addition to having a rectangular shape, however, the anode body and/or anode foil can be cylindrical, circular, square, D-shaped (see FIGS. 6A, 6B, 7A, 7B, 9A, and 9B), etc. Further, the anode body may also be "fluted" in that it may contain one or more furrows, grooves, depressions, or indentations to increase the surface to volume ratio to minimize ESR and extend the frequency response of the capacitor. Such "fluted" anode bodies are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Regardless of the particular shape of the anode body 102 or the anode foil 104, the height or thickness of the anode body 102 and the anode foil 104 can be minimized such that the resulting solid electrolytic capacitor 112 can have a low height profile to facilitate its use, for example, as an embedded passive component or microchip in a printed circuit board. For instance and referring to FIGS. 1-4, the overall height of the capacitor element 112 component including the anode body 102 and the anode foil 104 and any additional layers discussed in more detail below can have a height or thickness $T_1$ in the x-direction ranging from about 250 micrometers to about 1000 micrometers, such as from about 275 micrometers to about 800 micrometers, such as from about 300 micrometers to about 700 micrometers. Meanwhile, the anode foil 104 can have a thickness $T_2$ in the x-direction ranging from about 10 micrometers to about 300 micrometers, such as from about 15 micrometers to about 200 micrometers, such as from about 20 micrometers to about 150 micrometers, such as from about 25 micrometers to about 75 micrometers. Further, the anode body 102 can have a thickness $T_3$ in the x-direction ranging from about 200 micrometers to about 950 micrometers, such as from about 250 micrometers to about 750 micrometers, such as from about 275 micrometers to about 650 micrometers. In addition, the thickness $T_2$ of the anode foil 104 can be from about 1% to about 10%, such as from about 2% to about 8%, such as from about 3% to about 6% of the overall height $T_1$ of the capacitor element 112.

Further, referring to FIGS. 1-9C, the capacitor element 112 including the anode body 102 and any additional layers discussed in more detail below can have a width $W_1$ in the y-direction and/or a length in the z-direction $L_1$ ranging from about 0.5 millimeters to about 5 millimeters, such as from about 0.75 millimeters to about 4 millimeters, such as from about 1 millimeter to about 3 millimeters. Meanwhile, referring to FIG. 4, the anode foil 104 can, in some embodiments, include an anode foil tab 150 that can be useful during manufacturing and includes the portion of the anode foil 104 extending beyond the footprint of the finished capacitor element 112. Including the anode foil tab 150, the anode foil 104 can have a width $W_3$ in the y-direction ranging from about 0.5 millimeters to about 8 millimeters, such as from about 1 millimeter to about 6 millimeters, such as from about 1.5 millimeters to about 5 millimeters. Meanwhile, the anode foil 104 in the finished capacitor element 112 can have a width $W_2$ ranging from about 0.25 millimeters to about 5 millimeters, such as from about 0.5 millimeters to about 4 millimeters, such as from about 0.75 millimeters to about 3 millimeters after the anode foil tab 150 is trimmed from the capacitor element 112 at cut line $C_1$.

II. Dielectric

Once the anode body is adhered to the anode foil as described above, such as by resistance welding the anode foil directly to the anode body, the resulting anode component may be anodized so that a dielectric is formed over a surface of the anode body and/or within the entirety of the anode body. It is to be understood that only a portion of the anode foil will be free of the dielectric. Specifically, the anode foil has an upper surface that is welded to the porous anode body and a lower surface that is ultimately connected to an anode termination. As discussed above, the upper surface of the anode foil is joined to the sintered porous anode body (e.g., by resistance welding), where from about 15% to about 100%, such as from about 20% to about 95%, such as from about 25% to about 90% of the upper surface of the anode foil can be in contact with the porous anode body. Meanwhile, any portions of the upper surface of the anode foil not joined to the sintered porous anode body will be anodized and subsequently coated with the counter-electrode material (be it manganese dioxide ($MnO_2$) or conductive polymer, etc. as discussed in more detail below).

On the other hand, at least the portion of the lower surface of the anode foil that will ultimately be connected to the anode termination must be masked (physically, chemically) or later stripped of the dielectric. In one embodiment, the entirety of the lower surface of the anode foil will be free of the dielectric after mask removal or dielectric stripping. However, it is to be understood that in some embodiments, a significant portion (e.g., from about 75% to about 100%, such as from about 80% to about 99%, such as from about 85% to about 95%) of the lower surface of the anode foil will be masked and the remaining portion of the lower surface of the anode foil will be anodized.

Figure 2:
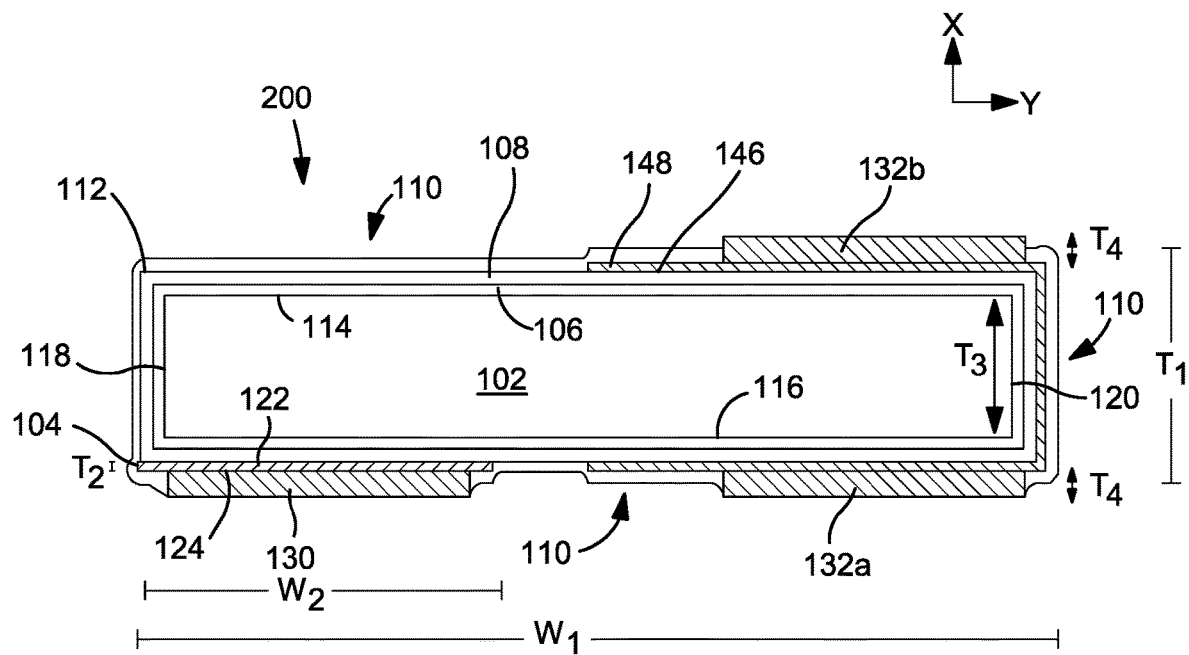
FIG. 2 is a cross-sectional view of a solid electrolytic capacitor in accordance with another embodiment of the present invention, where the solid electrolytic capacitor includes a three electrode configuration where one anode termination and a first cathode termination are positioned on the same side of the solid electrolytic capacitor and a second cathode termination is on another side of the solid electrolytic capacitor.
Figure 3:
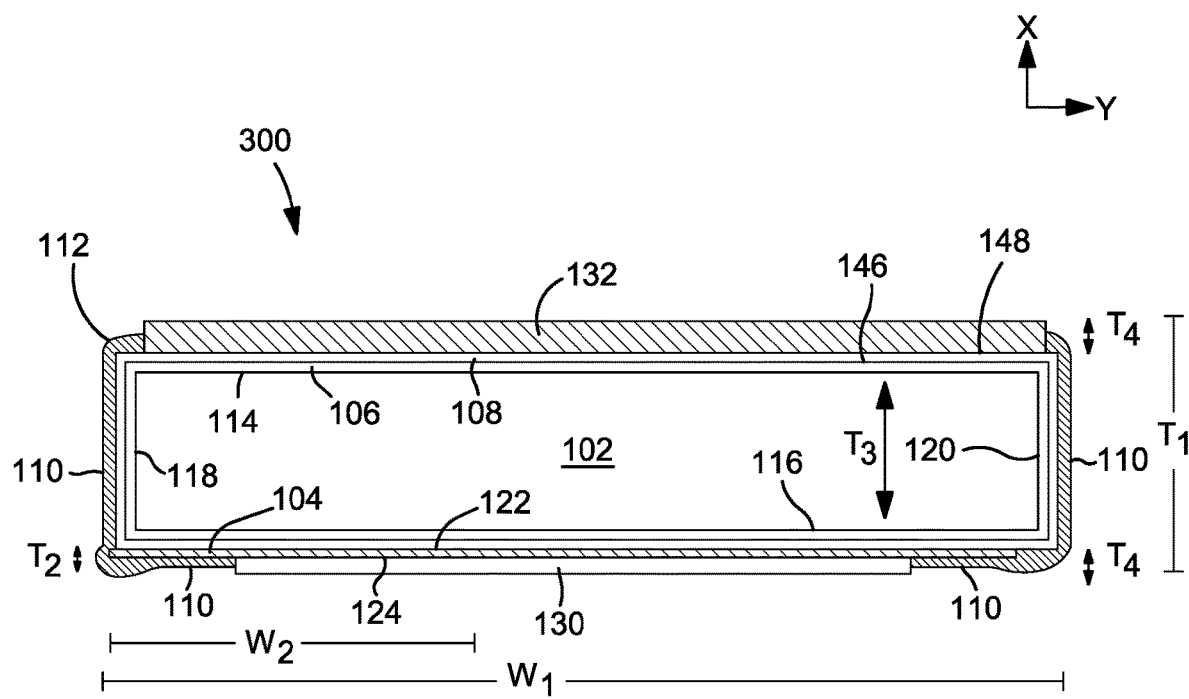
FIG. 3 is a cross-sectional view of a solid electrolytic capacitor in accordance with yet another embodiment of the present invention, where the solid electrolytic capacitor includes a two electrode configuration where one anode termination and one cathode termination are positioned on opposing sides of the solid electrolytic capacitor.

Although not shown in FIGS. 1-3, it is to be understood that after anodization, the dielectric is formed on surfaces within the anode body 102, such as inside its porous structure. Further, a dielectric layer 106 is formed on exterior surfaces of the anode body 102. For instance, as shown in FIGS. 1-3, the dielectric layer 106 can be formed over an upper surface 114, a first side surface 118, and a second side surface 120 of the anode body 102. However, in some embodiments, the dielectric layer 106 may not extend beyond the upper surface 122 of the anode foil 104 such that at least a portion of the lower surface 124 of the anode foil 104 is free of the dielectric layer 106 so that electrical contact between the anode foil 104 and an anode termination 130 can be made. It should also be understood that regardless of the exact surfaces on which it is located, the dielectric layer 106 can have a thickness of from about 1 micrometer to about 5 micrometers, such as from about 1 micrometer to about 2 micrometers in some embodiments, where the dielectric layer 106 can provide a coating to physically protect the resulting capacitor.

As stated above, the dielectric is formed by anodization. Anodization is an electrochemical process by which the anode component is oxidized to form a material having a relatively high dielectric constant. For example, the tantalum anode body may be anodized to tantalum pentoxide ($Ta_2O_5$). Typically, anodization is performed by initially applying an electrolyte to the anode body, such as by dipping the anode body into the electrolyte. The electrolyte is generally in the form of a liquid, such as a solution (e.g., acid or alkaline), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive having any suitable range of ionic conductivities. Exemplary electrolytes may include metal salts, alkali salts, alkali salt mixed with a glycol, an acid mixed with an organic solvent, or phosphoric acid mixed with a glycol such as ethylene glycol. To enhance the ionic conductivity of the electrolyte, a compound may be employed that is capable of dissociating in the solvent to form ions. Suitable ionic compounds for this purpose may include, for instance, acids, such as nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

During anodization, a current is passed through the electrolyte to form the dielectric layer. When protic anodization electrolytes are utilized, the rate limiting nature of the anodization process allows for the management of the dielectric thickness through control of the anodization voltage. For example, the anodization power supply may be initially configured galvanostatically until the required voltage is attained, thereafter being switched to a potentiostatic control mode and maintaining the required voltage until the current passing through the electrolyte reaches a fractional value of the initial current achieved in the galvanostatic control mode. Dielectric thickness control can also be achieved through fixed soak times in the potentiostatic control mode. Other known methods may also be employed, such as pulse or step potentiostatic methods. Anodization voltages typically range from about 4 volts to about 250 volts, such as from about 5 volts to about 200 volts, such as from about 9 volts to about 100 volts. During anodization, the electrolyte may be kept at an elevated temperature, such as from about 30° C. to about 200° C., in some embodiments from about 40° C. to about 150° C., such as sin some embodiments from about 50° C. to about 100° C. Anodic oxidation may also be done at ambient temperature or lower. As discussed above, the resulting dielectric layer 106 forms on the surfaces of the anode body 102, including those inside the porous anode body structure. The dielectric layer 106 may also form on the upper surface 122 of the anode foil 104, side surfaces 126 and 128 of the anode foil 104, and a portion of the lower surface 124 of the anode foil 104, although the impermeability of the anode foil 104 prevents the dielectric from penetrating inside the anode foil 104, and the formation of the dielectric layer 106 on the lower surface 124 and exposed side surfaces 126 and 128 of the anode foil 104 may be prevented by known mechanical or chemical means. In any event, at least a portion of the lower surface 124 of the anode foil 104 can be free of the dielectric layer 106, where this portion is ultimately connected to an anode termination. The rate of dielectric formation can be governed in part by temperature, with lower temperatures generally resulting in longer formation times.

III. Cathode

Referring again to FIGS. 1-3, after anodization, the anode body 102 including the dielectric layer 106 may then be subjected to a step for forming a cathode layer 108 that includes a solid electrolyte, such as a manganese dioxide, a conductive polymer, or a combination thereof, etc. However, at least a portion of the lower surface 124 of the anode foil 104 must be free of the cathode layer 108 to maintain electrical isolation between the anode and the cathode components of the capacitor, and the impermeability of the anode foil to liquids helps prevent the transmission of the solid electrolyte material from the upper surface 124 of the anode foil 104 to the lower surface 124 of the anode foil 104. Further, it is to be understood that the cathode layer 108 is only present where the dielectric layer 106 is also present. For instance, in some embodiments, the cathode layer 108 does not extend beyond the upper surface 122 of the anode foil 104 such that the lower surface 124 of the anode foil 104 is free of the cathode layer 108 so that electrical contact between the anode foil 104 and an anode termination 130 can be made. However, in other embodiments, such as where the dielectric layer 106 coats the side surfaces 126 and 128 and a portion of the lower surface 124 of the anode foil 104, the cathode layer 108 may also coat the side surfaces 126 and 128 and a portion of the lower surface 124 of the anode foil 104, although in such embodiments, the anode termination cannot contact these dielectric and cathode-coated areas of the anode foil 104. Preventing deposition of the cathode layer 108 on certain surfaces of the anode foil 104 as discussed above may be accomplished through known mechanical or chemical means during deposition of the cathode layer or via post-deposition material removal.

If the solid electrolyte includes manganese dioxide, the manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, or in conjunction with the formation of a manganese dioxide solid electrolyte, a conductive polymer coating may be employed that contains one or more polyheterocycles (e.g., polypyrroles; polythiophenes, poly (3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode body. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by H.C. Starck. CLEVIOS C is a commercially available catalyst for CLEVIOS M, which is 3,4-ethylene dioxythiophene, a PEDT monomer also sold by H.C. Starck. Once a catalyst dispersion is formed, the anode body may then be dipped into the dispersion so that the polymer forms on the surface of the anode body. Alternatively, the catalyst and monomer(s) may also be applied separately to the anode body. In one embodiment, for example, the catalyst may be dissolved in a solvent (e.g., butanol) and then applied to the anode body as a dipping solution. The anode body may then be dried to remove the solvent therefrom. Thereafter, the anode body may be dipped into a solution containing the appropriate monomer. Once the monomer contacts the surface of the anode body containing the catalyst, it chemically polymerizes thereon. Techniques, such as described above, may be described in more detail in U.S. Publication No. 2008/0232037 to Biler.

During or after the application of the solid electrolyte cathode layer, the solid electrolyte may be electrolytically healed. Healing may occur after each application of a solid electrolyte layer or may occur after the application of the entire coating. In some embodiments, the solid electrolyte may be healed by dipping the anode body into an electrolyte solution, such as a solution of acetic acid, and thereafter applying a constant voltage to the solution until the current is reduced to a preselected level or a predetermined soak time has elapsed. If desired, such healing may be accomplished in multiple steps. After application of some or all of the layers described above, anode component containing the dielectric layer and cathode may then be washed if desired to remove various byproducts, excess catalysts, and so forth. Further, in some instances, drying may be utilized after some or all of the dipping operations described above. For example, drying may be desired after applying the catalyst and/or after washing the component in order to open the pores of the anode body so that it can receive a liquid during subsequent dipping steps.

IV. Terminations

Referring to FIGS. 1-3, the solid electrolytic capacitor of the present invention may also contain an anode termination 130 to which the anode foil 104 of the capacitor element 112 is electrically connected and a cathode termination 132 to which the cathode layer 108 of the capacitor element is electrically connected. In some embodiments, the anode termination 130 and the cathode termination 132 are planar and can be directly connected to the anode foil 104 and the cathode layer 108, wherein the planar configuration and the direct electrical connection both improve the volumetric efficiency of the resulting capacitor. Further, the direct connection between the anode foil 104 and the anode termination 130 eliminates the need for an anode lead wire. Moreover, the thickness $T_4$ in the x-direction of the anode termination 130 and cathode termination 132 can be controlled to minimize the height profile or thickness of the capacitor to improve the volumetric efficiency of the resulting capacitor. For instance, the thickness of the terminations may range from about 10 micrometers to about 100 micrometers, such as from about 20 micrometers to about 80 micrometers, such as from about 30 micrometers to about 60 micrometers.

Any conductive material may be employed to form the terminations, such as a conductive metal (e.g., gold, copper, nickel, silver, nickel, zinc, tin, palladium, lead, copper, aluminum, molybdenum, titanium, iron, zirconium, magnesium, tungsten and alloys thereof). In one embodiment, however, the conductive metal can be a metal that is resistant to oxidation, such as gold, palladium, or platinum. In an additional embodiment, the conductive material from which the anode termination and the cathode termination are formed can be applied via a thin layer deposition technique such as physical vapor deposition (PVD), chemical vapor deposition (CVD), or any other suitable technique. PVD and CVD can facilitate the deposition of a thin metal layer having a nanometer scale onto the anode foil and cathode, which can further limit the height profile or thickness and enhance the volumetric efficiency of the solid electrolytic capacitor of the present invention. It is also to be understood that when formed from a oxidation resistant metal, the thin metal layer can be applied so that it is in direct contact with the anode foil or the solid electrolyte, without the need for the application of a carbon layer or any other barrier layer between the solid electrolyte and the cathode termination as are typically applied to prevent oxidation, where the elimination of such layers further reduces the thickness or height profile and enhances the volumetric efficiency of the resulting solid electrolytic capacitor. In another particular embodiment, the terminations can be in the form of a conductive paste, such as a silver polyimide paste that can be electroplated with nickel and a finish layer.

In still another embodiment, the terminations can be in the form of a metal plate or layer that can be connected to the anode foil and cathode using any technique known in the art, such as adhesive bonding and the like. In one embodiment, for example, a conductive adhesive may initially be applied to a surface of the anode and/or cathode terminations. The conductive adhesive may include, for instance, conductive metal particles contained with a resin composition. The metal particles may be gold, silver, copper, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

In yet another embodiment, the terminations can include a PVD or CVD oxygen barrier layer as described above, on which a separate metal layer or plate is disposed. For instance, the oxygen barrier layer can be gold, and the separate metal layer can be silver, titanium, etc.

V. Additional Layers/Components

Further, although not required, particularly if an oxidation resistant metal (e.g., gold) is utilized for the anode termination 130 and cathode termination 132, the solid electrolyte may optionally be applied with a carbon layer 146 (e.g., graphite), a metal layer 148 (e.g., silver), or a combination thereof. The metal layer can be a silver coating which may, for instance, act as a solderable conductor, contact layer, and/or charge collector for the capacitor, while the carbon layer 146 may limit contact of the silver coating with the solid electrolyte and/or terminations, which can reduce the risk of oxidation of the silver coating 148 by the solid electrolyte (e.g., manganese dioxide). Such coatings as the carbon layer 146 and the metal layer 148 may cover some or all of the solid electrolyte, while the anode foil 104 is isolated from such coatings as shown in FIGS. 1-3 and 5. Further, the carbon layer 146 and the metal layer 148 can have a total thickness ranging from about 10 micrometers to about 100 micrometers, such as from about 15 micrometers to about 75 micrometers, such as from about 20 micrometers to about 50 micrometers.

Figure 5:
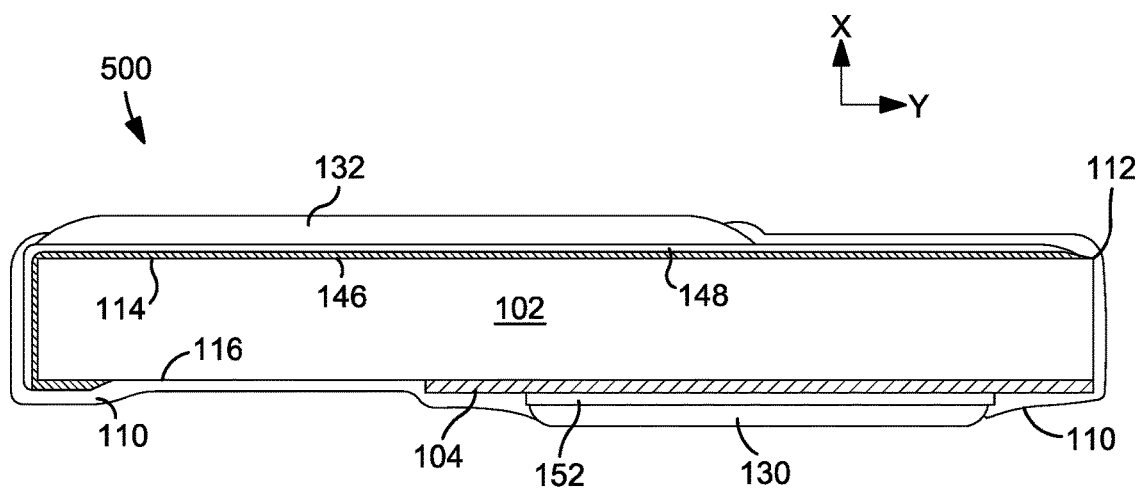
FIG. 5 is a cross-sectional view of a D-shaped solid electrolytic capacitor in accordance with still another embodiment of the present invention, where the solid electrolytic capacitor includes a two electrode configuration where one anode termination and one cathode termination are positioned on opposing sides of the solid electrolytic capacitor.

Further, in some embodiments and referring to FIGS. 1 and 5, a thin layer of an oxidation resistant material 152 (e.g., an oxidation resistant metal such as gold) can be applied to the exterior surfaces of the anode foil via physical vapor deposition (PVD), chemical vapor deposition (CVD), or any other suitable method, to provide a barrier between the tantalum foil 104 and the anode termination 130. Further, in embodiments where the sputtered oxidation resistant material 152 (e.g. gold) is of sufficient thickness, the oxidation resistant material 152 can provide sufficient mounting stability such that a separate anode termination 130 is not required. In some embodiments, the oxidation resistant material 152 can have a thickness ranging from about 10 nanometers to about 200 nanometers, such as from about 25 nanometers to about 150 nanometers, such as from about 50 nanometers to about 100 nanometers.

In addition, the solid electrolytic capacitor of the present invention can also include an insulating resin 110 (e.g., a conformal polyimide coating or an epoxy resin) that can be applied around the porous anode body 102 at portions of its upper surface 114, lower surface 116, side surface 118, side surface 120, and its front and rear surfaces (not shown), where the insulating resin 110 leaves portions of the anode termination 130 and cathode termination(s) 132 exposed, as shown in FIGS. 1-3 5, 6C, 7C, 8C, and 9C. However, it is also to be understood that the solid electrolytic capacitor can be, for instance, embedded into a printed circuit board without having an insulating resin disposed around the porous anode body 102. Instead, the insulating resin can be added to fill in the space between the circuit board and embedded capacitor after the embedded capacitor is properly positioned, or the printed circuit board can into which the capacitor is embedded can include an insulating resin having a recess into which the capacitor can be inserted. In any event, the particular design of the anode body 102 and anode foil 104 limits the amount of insulating resin 110 that may be utilized, which further enhances the volumetric efficiency of the capacitor. For instance, the insulating resin 110 can have a thickness in the y-direction ranging from about 5 micrometers to about 100 micrometers, such as from about 7.5 micrometers to about 75 micrometers, such as from about 10 micrometers to about 50 micrometers.

Various embodiments of solid electrolytic capacitors contemplated by the present invention are discussed in more detail below with respect to FIGS. 1-9C.

FIG. 1 is a cross-sectional view of a solid electrolytic capacitor 100 in accordance with one embodiment of the present invention, where the solid electrolytic capacitor 100 includes a two electrode configuration where one anode termination 130 and one cathode termination 132 are positioned on the same side of the solid electrolytic capacitor 100 (e.g., positioned near a lower surface 116 of the anode body 102). As shown, the anode body 102 includes a dielectric layer 106 and a cathode layer 108. Further, an upper surface 122 of the anode foil 104 is welded to the anode body 102, and the anode foil 104 is impermeable to liquids so that the dielectric layer 106 and the cathode layer 108 do not impregnate the anode foil 104. Further, mechanical and/or chemical means can be utilized to ensure that the surfaces of the anode foil 104 that are not welded to the anode body 102 (e.g., the lower surface 124 and side surfaces 126 and 128) can be free of the dielectric layer 106 and the cathode layer 108, although it is to understood that the side surfaces 126 and 128 and a portion of the lower surface 124 of the anode foil 104 may be coated with the dielectric layer 106 and cathode layer 108 so long as the portion of the lower surface 124 of the anode foil that is connected to the anode termination 124 is free of and isolated from the dielectric layer 106 and cathode layer 108. Moreover, a carbon layer 146 and a metal layer 148 (e.g., a silver layer) can be coated onto at least a portion of the cathode layer 108 for high reliability applications, where the anode foil 104 is isolated from the carbon layer 146 and the metal layer 148. In FIG. 1, the carbon layer 146 and the metal layer 148 are disposed on a portion of the cathode layer 108 that is adjacent an upper surface 114, a side surface 120, and a lower surface 116 of the anode body 102 but are not present on the cathode layer 108 that is adjacent the side surface 118 of the anode body 102 to provide sufficient isolation from the anode foil 104 and anode termination 130. Referring still to FIG. 1, an optional oxidation resistant material 152 can be positioned between the anode foil 104 and the anode termination 132. Further, when the oxidation resistant material 152 is a metal layer (e.g., gold) that is of sufficient thickness, it can take the place of the anode termination 132 so that a separate component is not needed. Further, an insulating resin 110 can be disposed around the surfaces of the resulting capacitor element 112, leaving at least a portion of the anode termination 130 and the cathode termination 132 exposed.

FIG. 2 is a cross-sectional view of another solid electrolytic capacitor 200 in accordance with another embodiment of the present invention, where the solid electrolytic capacitor 200 includes a three electrode configuration where one anode termination 130 and a first cathode termination 132a are positioned on the same side of the solid electrolytic capacitor 200 (e.g., at the lower surface 116 of the anode body 102) and a second cathode termination 132b is positioned on the side of the solid electrolytic capacitor 200 (e.g., at the upper surface 114 of the anode body 102). The solid electrolytic capacitor 200 can also include all of the components discussed above with respect to FIG. 1, although the oxidation resistant material 152 is not shown in FIG. 2.

FIG. 3 is a cross-sectional view of a solid electrolytic capacitor 300 in accordance with yet another embodiment of the present invention, where the solid electrolytic capacitor 300 includes a two electrode configuration where one anode termination 130 and one cathode termination 132 are positioned on opposing sides of the solid electrolytic capacitor 300. As shown, the anode termination 130 is positioned near the lower surface 116 of the anode body 102 and the cathode termination 132 is positioned near the upper surface 114 of the anode body 102). The solid electrolytic capacitor 300 can also include all of the components discussed above with respect to FIG. 1, although the oxidation resistant material 152 is not shown in FIG. 3.

FIG. 4 is a top surface view of the solid electrolytic capacitor 100 of FIG. 1 and illustrates an embodiment where the anode foil 104 can include an anode foil tab 150 that extends beyond a side surface 118 of the anode body 102, where the anode foil tab 150 can provide a fixturing contact for the capacitor element 112 during processing. After processing, the anode foil tab 150 can be removed via shearing, laser cutting, etc. at cut line $C_1$.

Figures 6A, 6B:
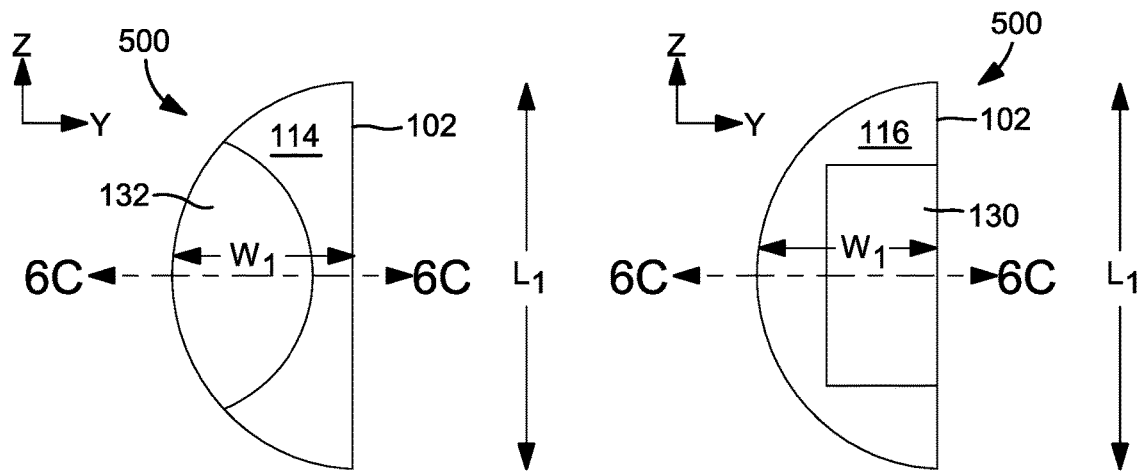
FIG. 6A is an upper surface view of the D-shaped solid electrolytic capacitor of FIG. 5.
FIG. 6B is a lower surface view of the D-shaped solid electrolytic capacitor of FIG. 5.
Figure 6C:
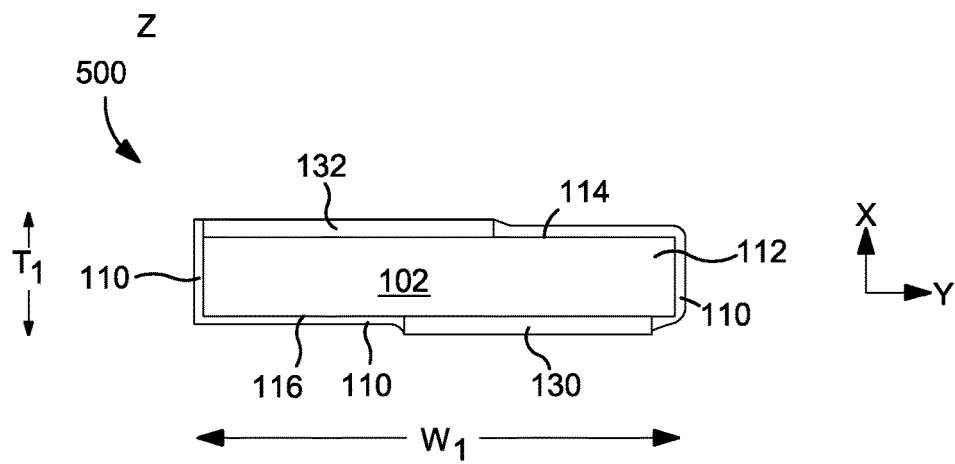
FIG. 6C is a cross-sectional view of the D-shaped solid electrolytic capacitor of FIGS. 6A, and 6B taken at line 6C.

FIG. 5 is a cross-sectional view of a D-shaped solid electrolytic capacitor 500 in accordance with still another embodiment of the present invention, where the solid electrolytic capacitor 500 includes a two electrode configuration where one anode termination 130 and one cathode termination 132 are positioned on opposing sides of the solid electrolytic capacitor 500. For instance, as shown in FIGS. 6A and 6B, respectively, the cathode termination 132 can be positioned near the upper surface 114 of the anode body 102 while the anode termination 130 can be positioned near the lower surface 116 of the anode body 102. Further, as shown, the cathode termination 132 can have a curvilinear or semicircular shape, while the anode termination 130 can have a rectangular shape, although it is to be understood that any suitable shape can be utilized for the terminations. FIG. 6C is a cross-sectional view of the D-shaped solid electrolytic capacitor 500 of FIGS. 6A, and 6B taken at line 6C and is the same solid electrolytic capacitor 500 of FIG. 5 except in a simplified view where the carbon layer 146, the metal layer 148, the anode foil 104, and the oxidation resistant material 152 are not shown in order to clearly show the placement of the anode termination 130 and the cathode termination 132 of FIGS. 6A and 6B.

Figure 7A:
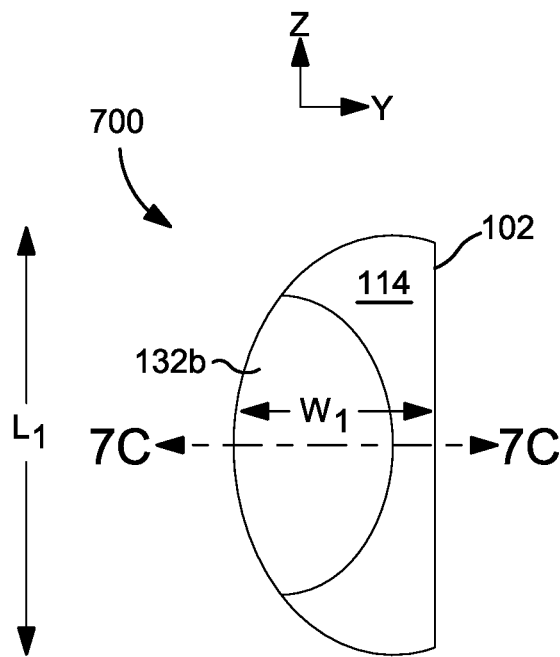
FIG. 7A is an upper surface view of another embodiment of a D-shaped solid electrolytic capacitor in accordance with another embodiment of the present invention.
Figure 7B:
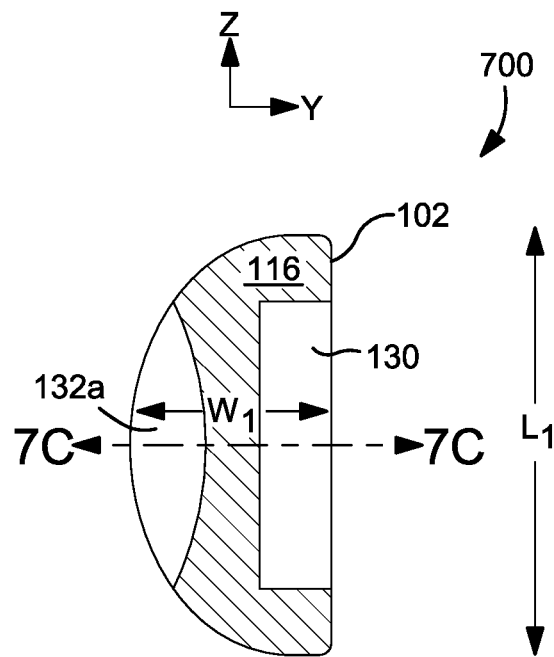
FIG. 7B is a lower surface view of the D-shaped solid electrolytic capacitor of FIG. 7A.
Figure 7C:
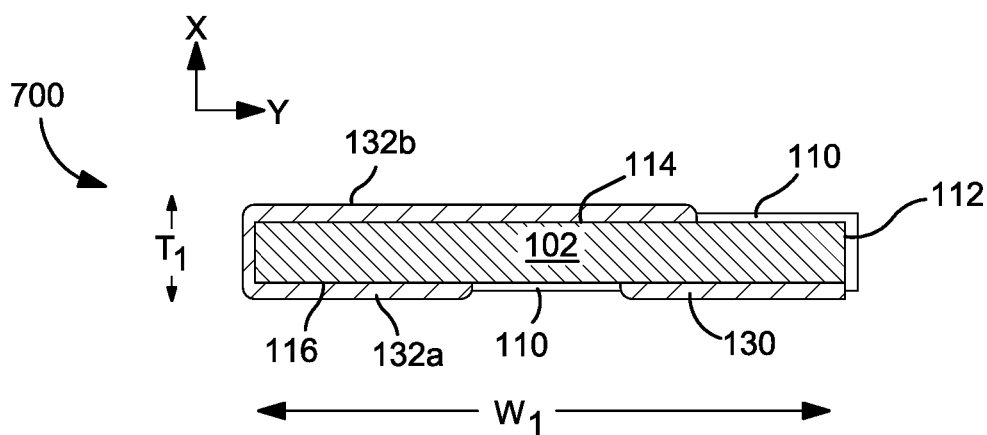
FIG. 7C is a cross-sectional view of the D-shaped solid electrolytic capacitor of FIGS. 7A and 7B taken at line 7C.

Turning now to FIGS. 7A-7C, another embodiment of a solid electrolytic capacitor 700 is shown, where the solid electrolytic capacitor 700 has a three electrode configuration. FIG. 7A is an upper surface 114 view of a D-shaped solid electrolytic capacitor 700, FIG. 7B is a lower surface 116 view of the D-shaped solid electrolytic capacitor 700 of FIG. 7A, and FIG. 7C is a cross-sectional view of the D-shaped solid electrolytic capacitor 700 of FIGS. 7A and 7B taken at line 7C. As shown, an anode termination 130 can be positioned near the lower surface 116 of the anode body 102 and a first cathode termination 132a can also be positioned near the lower surface 116 of the anode body 102. Further, a second cathode termination 132b can be positioned near the upper surface 114 of the anode body 102. In addition, the first cathode termination 132a and the second cathode termination 132b can have a curvilinear or semicircular shape, while the anode termination 130 can have a rectangular shape, although it is to be understood that any suitable shape can be utilized for the terminations. Further, the second cathode termination 132b can extend across a larger portion of the upper surface 114 of the anode body 102 in the y-direction compared to the first cathode termination 132a on the lower surface 116 of the anode body 102, although it is to be understood that other arrangements are also contemplated where the first cathode termination 132a can extend across a larger portion of the lower surface 116 of the anode body 102 in the y-direction compared to the second cathode termination 132b on the upper surface 114 of the anode body.

Figure 8A:
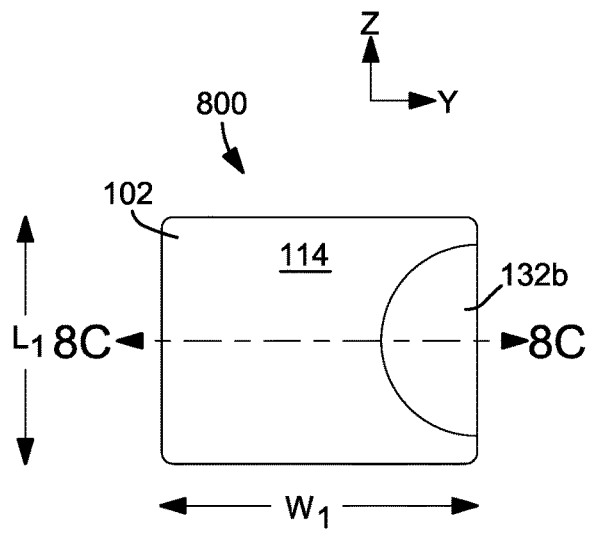
FIG. 8A is an upper surface view of a square-shaped solid electrolytic capacitor in accordance with another embodiment of the present invention.
Figure 8B:
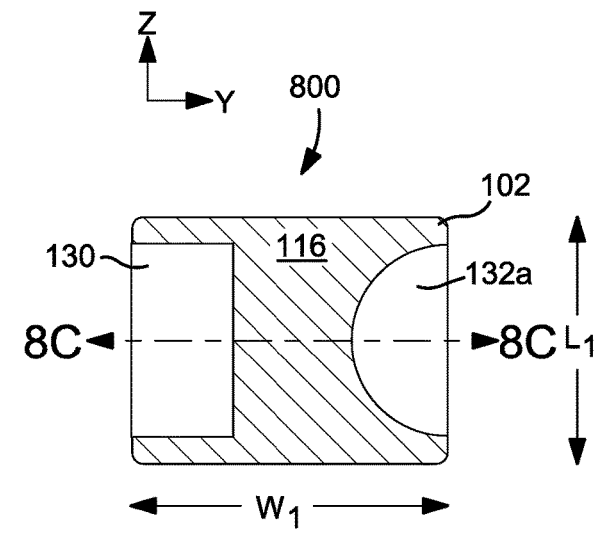
FIG. 8B is a lower surface view of the square-shaped solid electrolytic capacitor of FIG. 8A.
Figure 8C:
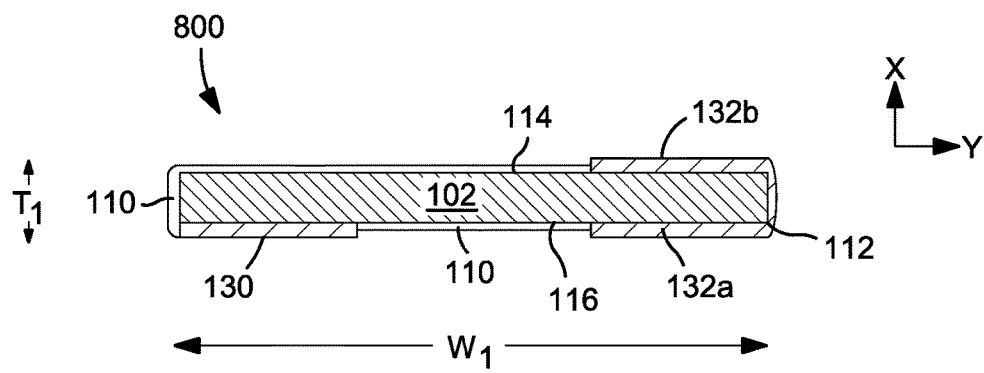
FIG. 8C is a cross-sectional view of the square-shaped solid electrolytic capacitor of FIGS. 8A and 8B taken at line 8C.

Referring now to FIGS. 8A-8C, yet another embodiment of a solid electrolytic capacitor 800 is shown, where the solid electrolytic capacitor 800 has a three electrode configuration. FIG. 8A is an upper surface 114 view of a square-shaped solid electrolytic capacitor 800, FIG. 8B is a lower surface 116 view of the square-shaped solid electrolytic capacitor 800 of FIG. 8A, and FIG. 8C is a cross-sectional view of the square-shaped solid electrolytic capacitor 800 of FIGS. 8A and 8B taken at line 8C. As shown, an anode termination 130 can be positioned near the lower surface 116 of the anode body 102 and a first cathode termination 132a can also be positioned near the lower surface 116 of the anode body 102. Further, a second cathode termination 132b can be positioned near the upper surface 114 of the anode body 102. In addition, the first cathode termination 132a and the second cathode termination 132b can have a curvilinear or semicircular shape, while the anode termination 130 can have a rectangular shape, although it is to be understood that any suitable shape can be utilized for the terminations. Further, the first cathode termination 132a and the second cathode termination 132b can extend across equal portions of the lower surface 116 and the upper surface 114 of the anode body 102 in the y-direction, although it is to be understood that other arrangements are also contemplated, such as where the first cathode termination 132a can extend across a larger portion of the lower surface 116 of the anode body 102 in the y-direction compared to the second cathode termination 132b on the upper surface 114 of the anode body and vice versa.

Figure 9A:
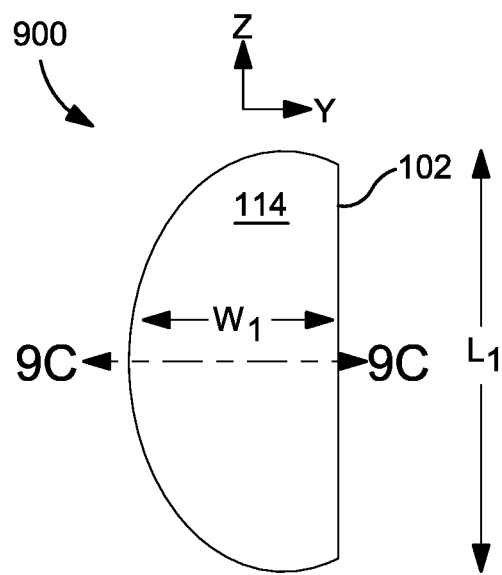
FIG. 9A is an upper surface view of another embodiment of a D-shaped solid electrolytic capacitor in accordance with another embodiment of the present invention.
Figure 9B:
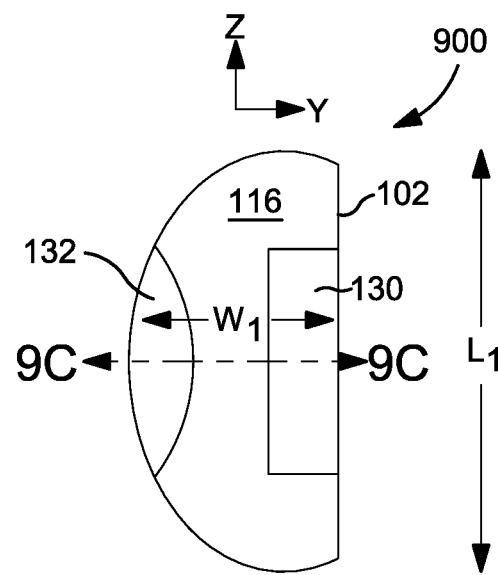
FIG. 9B is a lower surface view of the D-shaped solid electrolytic capacitor of FIG. 9A.
Figure 9C:
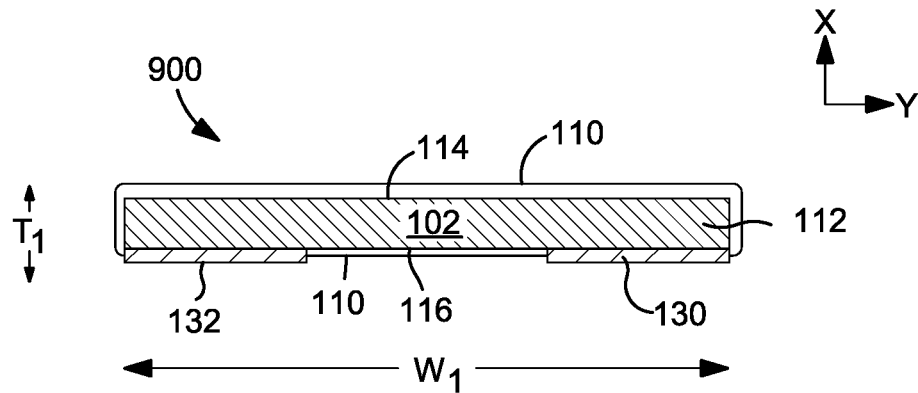
FIG. 9C is a cross-sectional view of the D-shaped solid electrolytic capacitor of FIGS. 9A and 9B taken at line 9C.

Turning now to FIGS. 9A-9C, another embodiment of a solid electrolytic capacitor 900 is shown, where the solid electrolytic capacitor 900 has a same side two electrode configuration. FIG. 9A is an upper surface 114 view of a D-shaped solid electrolytic capacitor 900, FIG. 9B is a lower surface 116 view of the D-shaped solid electrolytic capacitor 900 of FIG. 9A, and FIG. 9C is a cross-sectional view of the D-shaped solid electrolytic capacitor 900 of FIGS. 9A and 9B taken at line 9C. As shown, an anode termination 130 and a cathode termination 132 can be positioned near the lower surface 116 of the anode body 102. In addition, the cathode termination 132 can have a curvilinear or semicircular shape, while the anode termination 130 can have a rectangular shape, although it is to be understood that any suitable shape can be utilized for the terminations. Further, the anode termination 130 and the cathode termination 132 can extend across equal portions of the lower surface 116 of the anode body 102 in the y-direction, although it is to be understood that other arrangements are also contemplated where the cathode termination 132 can extend across a larger portion of the lower surface 116 of the anode body 102 compared to anode termination 130 and vice versa.

Figure 10:
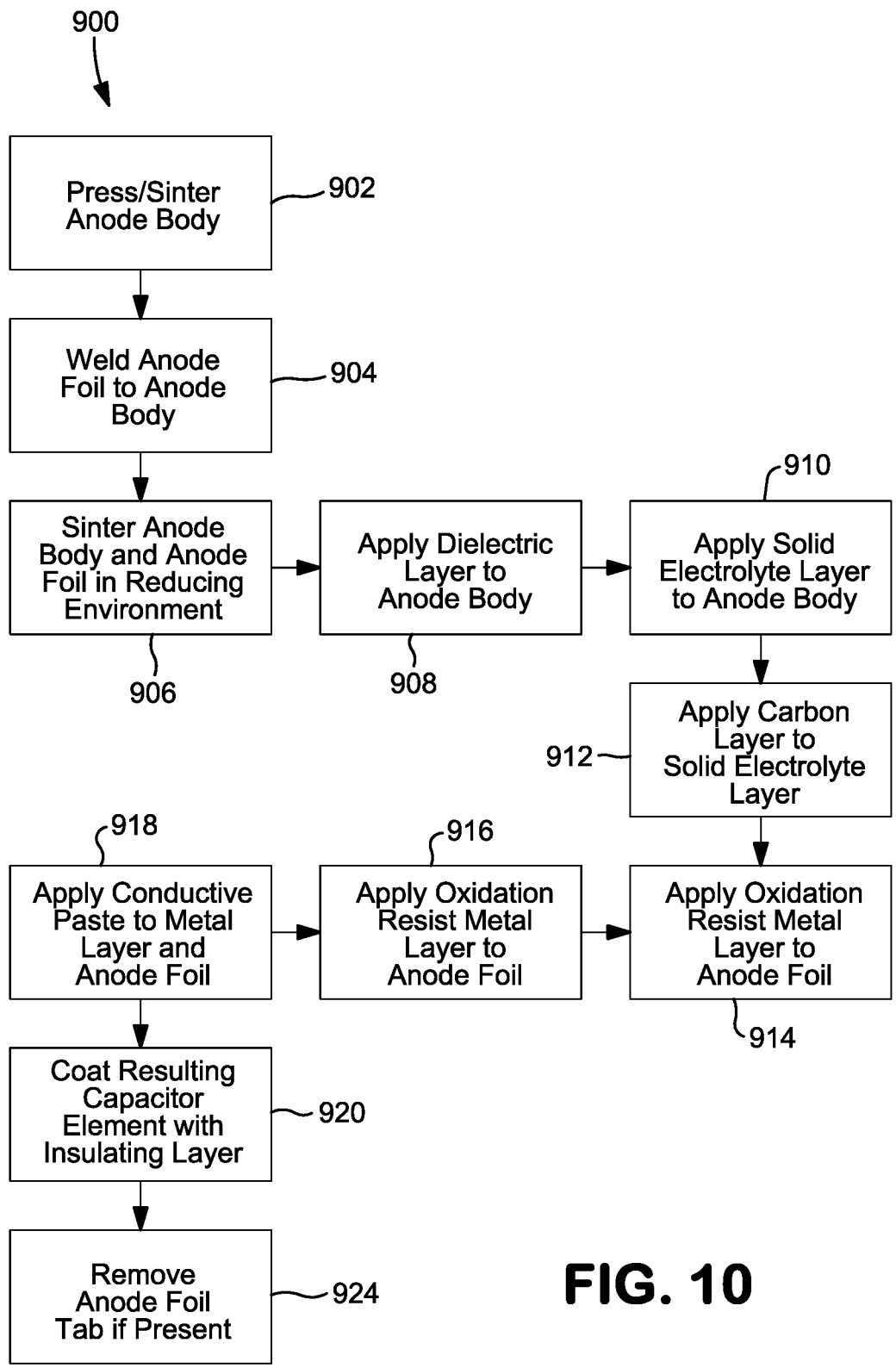
FIG. 10 is a flow chart illustrating a method of forming a solid electrolytic capacitor in accordance with one embodiment of the present invention.

Turning now to FIG. 10, the solid electrolytic capacitors discussed above can be formed according to various methods contemplated by the present invention. In one particular embodiment, the solid electrolytic capacitors can be formed according to method 900. First, in step 902, an anode body 102 can be pressed and sintered as described in detail above. Next, in step 904, the anode foil 104 can be welded to the anode body 102, such as by resistance welding. Then, in step 906, the anode body 102 and the anode foil 104 welded thereto can be sintered in a reducing environment, such as in the presence of hydrogen gas to eliminate any microstructural damage that may have occurred during the welding process. Next, in step 908, the dielectric layer 106 can be applied to the anode body 102 (and, optionally, portions of the anode foil 104 as described above) via anodization as described in detail above. Further, in step 910, the solid electrolyte layer or cathode layer 108 can be applied to the anode body 102 (and, optionally, portions of the anode foil 104 as described above). Then, in step 912, the optional carbon layer 146 can be applied to the cathode layer 108, followed by application of the optional metal layer 148 in step 914. Next, in step 916, the optional oxidation resistant material 152 (e.g., gold) can be applied to the anode foil 104. Further, in step 918, a conductive paste can be applied to the anode foil 104 and the cathode layer 108 to form the anode termination 130 and the cathode termination 132, although it is to be understood that any other suitable terminations can also be applied in step 918. Thereafter, in step 920, the resulting capacitor element 112 can be coated with an insulating layer 110. Further, if the anode foil 104 included an anode foil tab 150, the anode foil tab 150 can be removed. Moreover, it is to be understood that not all of the steps described above are required and that additional steps as set forth above may be utilized in forming the capacitors and modules contemplated by the present invention.

VI. Applications

In one embodiment of the present invention, the solid electrolytic capacitor of FIGS. 1-9C can be used as an embedded component of a thin electronic part such as a printed circuit board. In another embodiment, the capacitor can have a capacitance rating of about 10 microfarads at a voltage rating of about 10 volts. Due to its small footprint, such a capacitor can be used, for example, in implantable medical devices. The capacitor can have similar dimensions as the silicon-based integrated passives that are known by one of skill in the art and that can be embedded into a printed circuit board structure. As such, the solid electrolytic capacitor can have a thickness $T_1$ in the x-direction of from about 250 micrometers to about 1000 micrometers, such as from about 275 micrometers to about 800 micrometers, such as from about 300 micrometers to about 700 micrometers.

Figure 11:
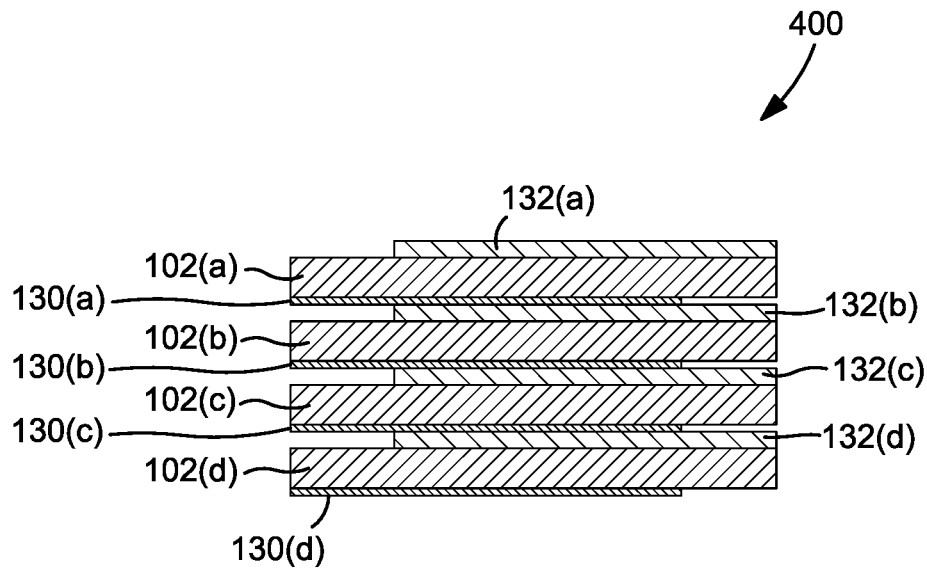
FIG. 11 is a cross-sectional view of a module including multiple capacitors of the present invention arranged in series.
Figure 12:
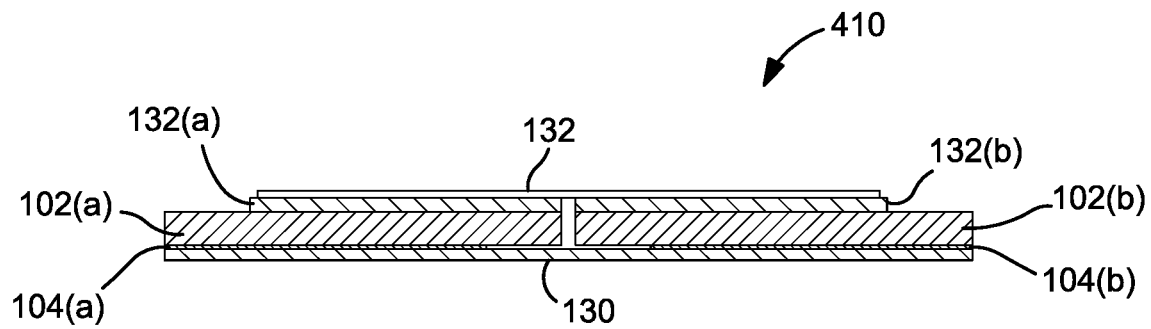
FIG. 12 is a cross-sectional view of a module including multiple capacitors of the present invention arranged in parallel.
Figure 13:
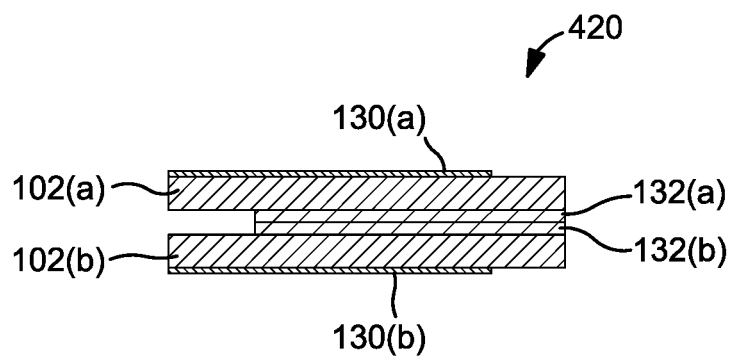
FIG. 13 is a cross-sectional view of a module including multiple capacitors of the present invention arranged in a non-polar configuration.

Referring now to FIGS. 11-13, several modules in which a plurality of the solid electrolytic capacitor of FIGS. 1-9C can be incorporated are illustrated. Such modules can be encapsulated or left unencapsulated for embedding purposes. The modules can include two or more solid electrolytic capacitors of FIG. 1-9C that can have the same or different capacitance and voltage ratings. Such modules can achieve increases in voltage rating or capacitance, reduction in equivalent series resistance (ESR), allow for non-polarity, or a combination thereof. Depending on the particular arrangement of the module, voltage ratings well beyond 100 volts can be achieved.

In particular, FIG. 11 shows a module 400 that includes four anode bodies 102(a)-(d), four anode terminations 130(a)-(d), and four cathode terminations 132(a)-(d) arranged in series. When based on a 10 microfarad, 10 volt capacitor, the module 400 can have a capacitance of 2.5 microfarads and voltage rating of 40 volts.

Further, FIG. 12 shows a module 410 that includes two anode bodies 102(a) and 102(b) and two anode foils 104(a) and 104(b) arranged in parallel. The module also includes an anode termination 130 and two cathode terminations 132(a) and 132(b) that are electrically connected with a main cathode termination 132. When based on a 10 microfarad, 10 volt capacitor, the module 410 can have a capacitance of 20 microfarads and voltage rating of 10 volts. Although not shown, instead of two capacitors, four capacitors can be arranged in parallel in a two capacitor by two capacitor block to achieve a module having a capacitance of 40 microfarads and a voltage rating of 10 volts.

Meanwhile, FIG. 13 shows a module 420 having a non-polar configuration where two anode bodies 102(*a*) and 102(*b*) and two anode terminations 130(*a*) and 130(*b*) are arranged such that the cathode terminations 132(*a*) and 132(*b*) are in contact as shown. When based on a 10 microfarad, 10 volt capacitor, the module 420 can have a capacitance of 5 microfarads and voltage rating of 10 volts.

Further, while FIGS. 11-13 show modules utilizing capacitor elements with two electrode configurations, it is to be understood that a three electrode configuration can also be utilized, where a three electrode configuration would allow for interlayer connections within a printed circuit board (PCB). It is also to be understood that the present invention contemplates modules with same side electrode configurations. One advantage of utilizing a three electrode or same side electrode configuration is that such designs allow for increased flexibility in PCB layout and interlayer connection design.

The capacitors and modules formed in accordance with the present invention can achieve an advantageously increased capacitance and advantageously reduced Equivalent Series Resistance (ESR), while maintaining comparable levels of leakage current and dissipation factor.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor, comprising:
 a porous anode body;
 an anode foil, wherein the anode foil is impermeable to liquids, is disposed only on a lower planar surface of the porous anode body, and extends up to but not beyond a side surface of the porous anode body, wherein an upper surface of the anode foil is in direct contact with the lower planar surface of the porous anode body, wherein the anode foil has a width less than or equal to a width of the porous anode body, wherein the anode foil has a thickness ranging from 10 micrometers to 75 micrometers, further wherein the porous anode body and the anode foil comprise a valve metal;
 a dielectric overlying at least a portion of the porous anode body, wherein the dielectric is also formed within the porous anode body;
 a cathode overlying at least a portion of the dielectric that overlies the porous anode body, the cathode comprising a solid electrolyte, wherein transmission of the solid electrolyte from the upper surface of the anode foil to a lower surface of the anode foil is prevented, and wherein at least a portion of the lower surface of the anode foil is free of the dielectric and the solid electrolyte;
 an anode termination that is electrically connected to the portion of the lower surface of the anode foil that is free of the dielectric and the solid electrolyte; and
 a cathode termination that is electrically connected to the solid electrolyte, wherein the solid electrolytic capacitor is free of an anode lead wire.

2. The solid electrolytic capacitor of claim 1, wherein the valve metal comprises tantalum, niobium, aluminum, hafnium, titanium, an electrically conductive oxide thereof, or an electrically conductive nitride thereof.

3. The solid electrolytic capacitor of claim 1, wherein the upper surface of the anode foil is welded to the planar surface of the porous anode body.

4. The solid electrolytic capacitor of claim 1, wherein an oxidation resistant metal layer is disposed between the anode foil and the anode termination.

5. The solid electrolytic capacitor of claim 1, wherein the solid electrolyte comprises manganese dioxide, a conductive polymer, or a combination thereof.

6. The solid electrolytic capacitor of claim 1, wherein a carbon layer overlies the cathode.

7. The solid electrolytic capacitor of claim 6, wherein a metal layer overlies the carbon layer.

8. The solid electrolytic capacitor of claim 7, wherein the metal layer comprises silver.

9. The solid electrolytic capacitor of claim 1, wherein the solid electrolytic capacitor has a thickness of from about 250 micrometers to about 1000 micrometers, and wherein the anode termination and the cathode termination each have a thickness ranging from about 10 micrometers to about 100 micrometers.

10. The solid electrolytic capacitor of claim 1, wherein the anode termination and the cathode termination each comprise a conductive paste.

11. The solid electrolytic capacitor of claim 1, wherein the solid electrolytic capacitor includes a coating of an insulating resin, wherein at least a portion of the anode termination and a portion of the cathode termination are exposed and free of the coating.

12. A module comprising a plurality of the solid electrolytic capacitors of claim 1, wherein the plurality of solid electrolytic capacitors are arranged in series, in parallel, or in a non-polar configuration.

13. A method for forming a solid electrolytic capacitor, the method comprising:
 forming a porous anode body from a powder;
 sintering the porous anode body;
 welding an upper surface of an anode foil to only a lower planar surface of the sintered porous anode body such that the anode foil extends up to but not beyond a side surface of the porous anode body, wherein an upper surface of the anode foil is in direct contact with the lower planar surface of the sintered porous anode body, wherein the anode foil is impermeable to liquids and has a width less than or equal to a width of the porous anode body, wherein the anode foil has a thickness ranging from 10 micrometers to 75 micrometers, further wherein the powder and the anode foil are formed from a valve metal;
 anodically oxidizing at least a portion of the sintered porous anode body to form a dielectric that overlies at least a portion of the sintered porous anode body, wherein the dielectric is also formed within the sintered porous anode body;
 applying a solid electrolyte to at least a portion of the anodically oxidized sintered porous anode body, wherein transmission of the solid electrolyte from the upper surface of the anode foil to a lower surface of the anode foil is prevented, and wherein at least a portion of the lower surface of the anode foil is free of the dielectric and the solid electrolyte;

electrically connecting the portion of the lower surface of the anode foil that is free of the dielectric and the solid electrolyte to an anode termination; and electrically connecting the solid electrolyte to a cathode termination, wherein the solid electrolytic capacitor is free of an anode lead wire.

14. The method of claim 13, wherein the sintered porous anode body and the anode foil are sintered in a reducing environment.

15. The method of claim 13, wherein an oxidation resistant metal layer is applied to the anode foil before the anode foil is electrically connected to the anode termination.

16. The method of claim 13, wherein the solid electrolytic capacitor has a thickness ranging from about 250 micrometers to about 1000 micrometers.

17. The method of claim 13, wherein a carbon layer is applied over the solid electrolyte and a metal layer is applied over the carbon layer.

18. The method of claim 13, further comprising coating the solid electrolytic capacitor with an insulating resin, wherein at least a portion of the anode termination and a portion of the cathode termination are exposed and free of the coating.

\* \* \* \* \*